United States Patent [19]
Kee et al.

[11] Patent Number: 5,726,659
[45] Date of Patent: Mar. 10, 1998

[54] MULTIPATH CALIBRATION IN GPS PSEUDORANGE MEASUREMENTS

[75] Inventors: Changdon Kee, Mountain View; Bradford W. Parkinson, Los Altos, both of Calif.

[73] Assignee: Stanford University, Stanford, Calif.

[21] Appl. No.: 532,387

[22] Filed: Sep. 21, 1995

[51] Int. Cl.$^6$ .................... H04B 7/185; G01S 5/02; G01S 3/16

[52] U.S. Cl. .................... 342/352; 342/357; 342/378

[58] Field of Search .................... 342/357, 352, 342/378

[56] References Cited

U.S. PATENT DOCUMENTS

| | | | |
|---|---|---|---|
| 4,669,091 | 5/1987 | Nossen | 375/232 |
| 5,347,536 | 9/1994 | Meehan | 375/210 |
| 5,450,448 | 9/1995 | Sheynblat | 375/346 |
| 5,493,588 | 2/1996 | Lennen | 375/343 |
| 5,537,121 | 7/1996 | Lennen | 342/357 |

OTHER PUBLICATIONS

Cohen et al "Mitigating Multipath in GPS-Based Attitude Determination" Advances in the Astronautical Sciences, AAS Guidance & Cont. Conf. 1991.

*Primary Examiner*—Gregory C. Issing
*Attorney, Agent, or Firm*—Lumen Intellectual Property Services

[57] ABSTRACT

Novel techniques are disclosed for eliminating multipath errors, including mean bias errors, in pseudorange measurements made by conventional global positioning system receivers. By correlating the multipath signals of different satellites at their cross-over points in the sky, multipath mean bias errors are effectively eliminated. By then taking advantage of the geometrical dependence of multipath, a linear combination of spherical harmonics are fit to the satellite multipath data to create a hemispherical model of the multipath. This calibration model can then be used to compensate for multipath in subsequent measurements and thereby obtain GPS positioning to centimeter accuracy.

13 Claims, 27 Drawing Sheets

MULTIPATH CALIBRATION IN GPS PSEUDORANGE MEASUREMENTS

This invention was supported in part by Federal Aviation Administration grant FAA/DOT 93-G-004, and by NASA grant NA S8-36125. The Government has certain rights in the invention.

FIELD OF THE INVENTION

The present invention relates to methods for improving pseudorange measurements in a global positioning system (GPS). More specifically, it relates to methods for reducing and eliminating multipath errors in GPS pseudorange measurements.

BACKGROUND

Multipath is a major GPS ranging error source. Multipath error is traditionally considered to be noise correlated over time in GPS pseudorange and continuous carrier phase measurement. FIG. 1 shows how multipath, which depends on the geometry around a GPS antenna, is generated by reflected signals from nearby structures. Although the multipath error in present continuous carrier phase measurements is on the order of a few centimeters or less, the multipath error in pseudorange can be as much as 50 meters. Because receiver noise and multipath errors in continuous carrier phase measurement are very small compared to those in pseudorange measurement, it is always preferable to use differential measurement techniques which are based on continuous carrier phase. But the success of differential techniques using continuous carrier phase depends on how quickly the right cycle ambiguity can be found. Since the reliability and success rate of solving for cycle ambiguities are highly related to the degree to which multipath error can be eliminated, there is a need for eliminating multipath errors in pseudorange measurements.

The continuous carrier signal comprises an integer and a fraction of wavelength. The precision of the fraction currently can be reduced to 0.2 to 2 centimeters, but this phase information is of little use unless the correct integer can be determined (one unit corresponds to about 20 cm). Solving for cycle ambiguity is the determination of this integer.

Because the noise in continuous carrier phase measurement is very small compared to the accuracy of pseudorange measurement, it is natural to use continuous carrier phase measurement and attempt to solve cycle ambiguity. In principle, cycle ambiguity can be solved using the fact that pseudorange and continuous carrier phase measurements are supposed to be the same except for ionospheric time delay which is opposite in the above two different measurements and can be measured using a dual-frequency receiver. But cycle ambiguity can not be solved completely with present techniques without waiting a very long time because multipath noise in the pseudorange is too large.

Differential techniques can eliminate most GPS errors common both to a user and a nearby reference station, such as ephemeris errors, satellite clock error, Selective Availability (SA), ionospheric time delay, and tropospheric errors. But multipath errors are not common to a user and a reference station and therefore cannot be eliminated in this way.

In the article Cohen, C. E. and Parkinson, B. W., "Mitigating Multipath in GPS-Based Attitude Determination," *Advances in the Astronautical Sciences*, AAS Guidance and Control Conference, Keystone, Colo., 1991, a technique is described that successfully calibrated the relative multipath error in continuous carrier phases between two antennas for attitude determination. This technique, however, cannot be used for calibrating or eliminating multipath errors in position measurements since it only applies to flight vehicles and other relatively isolated vehicles where the only significant multipath source is the vehicle body itself.

A method for obtaining a significant reduction in multipath error is described in the article Van Nee, R. D. J., Siereveld, J., Fenton, P. C., and Townsend, B. R., "The Multipath Estimating Delay Lock Loop: Approaching Theoretical Accuracy Limits," *IEEE 1994 Position Location and Navigation Symposium*, Las Vegas, Nev., April, 1994, pp. 246–251. Van Nee used a new receiver hardware architecture using multiple correlators to identify multipath in the GPS signal. Although this approach greatly reduced multipath error in the laboratory prototypes, because it needs multiple correlators for each channel to estimate multipath, it requires a CPU in the GPS receiver that is more powerful than the CPU present in current receivers. Consequently, the existing receivers cannot benefit from this technique and its implementation would require replacing old receivers with expensive new Another technique to reduce multipath is described in the article Bishop, G. J., Coco, D. S., Kappler, P. H., and Holland, E. A., "Studies and Performance of a New Technique for Mitigation of Pseudorange Multipath Effects in GPS Ground Stations," *Proceedings of the 1994 National Technical Meeting*, The Institute of Navigation, San Diego, Calif., January, 1994, pp. 231–242. Bishop used a template technique to reduce multipath error in pseudorange. His technique takes advantage of the daily repetition of the GPS satellite trajectory from a fixed ground station to create a template of the averaged multipath error signature specific to each satellite pass. This time-averaging technique, however, eliminates only the noise component of the multipath and not the bias component. Consequently, it results in a multipath with absolute level accurate only to the degree that the multipath is zero-mean for each satellite pass. In short, rather than solving multipath mean bias, it simply assumes zero-mean when this is not actually the case. Solving for the multipath mean bias, however, is crucial to solving for cycle ambiguities. Without determining the actual values of these biases, which are different for different satellites, an attempt to solve cycle ambiguity and to determine user position will give erroneous results. This technique, therefore, does not reduce multipath errors to the degree necessary to solve cycle ambiguity and obtain positioning information to within centimeter accuracy.

In summary, although multipath errors in GPS pseudorange measurements have been studied by many people, no prior art has succeeded in the actual calibration and elimination of multipath errors, including multipath mean bias, on GPS pseudorange measurements without introducing expensive new receiver hardware architectures.

OBJECTS OF THE INVENTION

It is a primary object of the present invention to reduce multipath error in pseudorange and greatly improve the speed and reliability of solving cycle ambiguity. It is an additional object of the present invention to calibrate multipath error surrounding GPS antenna, eliminate it in real time, find the right cycle ambiguity very quickly and reliably, and finally achieve centimeter level of positioning accuracy. It is a further object of the invention to obtain these results using a software approach which can be easily applied to existing GPS receivers.

SUMMARY OF THE INVENTION

These objects and advantages are achieved by a method for multipath calibration in a global positioning system comprising a GPS receiver, a first satellite having a first trajectory, and a second satellite having a second trajectory that intersects the first trajectory in an azimuth vs. elevation plot at a cross-over point. The method comprises the steps of (1) receiving first and second signals at the receiver from first and second satellites, where a portion of each signal is received when the respective satellite is at the cross-over point; and (2) determining first and second calibrated multipath signals by correlating the cross-over portions of the signals with each other, whereby the relative mean multipath bias between the signals is eliminated. This calibration technique is used to eliminate multipath pseudorange errors in subsequent signals received at the receiver from the two satellites by using the two calibrated multipath signals. By fitting a linear combination of spherical harmonic functions to the two calibrated multipath signals and eliminating multipath pseudorange errors in subsequent signals received at the receiver from the satellites by using the linear combination of spherical harmonic functions, multipath errors can be compensated for. This technique is normally applied to more than two satellites whose respective signals are simultaneously correlated. Another aspect of the invention includes the steps of mounting around an antenna of the receiver a cylinder that reflects GPS signals and is tapered outward toward the top, then measuring the attitude of the receiver and the antenna and correlating the attitude with the subsequent signals.

BRIEF DESCRIPTION OF THE DRAWING FIGURES

DETAILED DESCRIPTION

Figure 1:
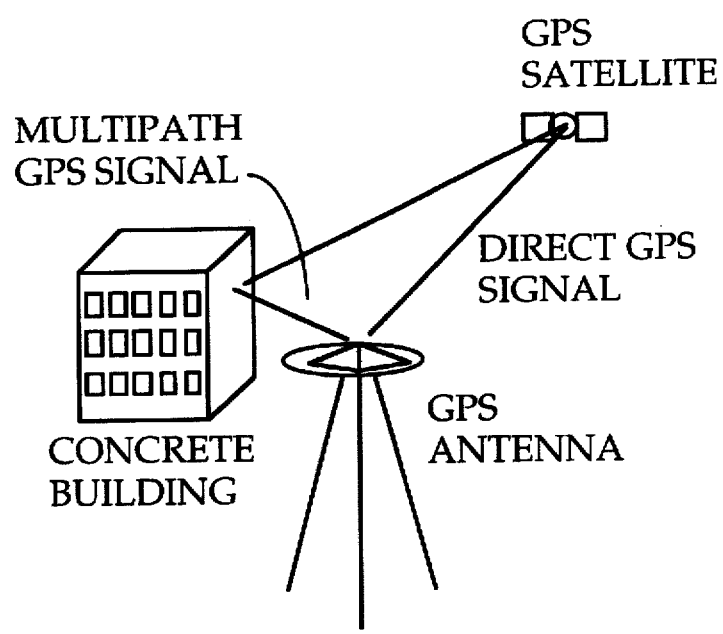
FIG. 1 is an illustration of how a multipath signal is generated by reflection from a nearby structure.
Figure 2:
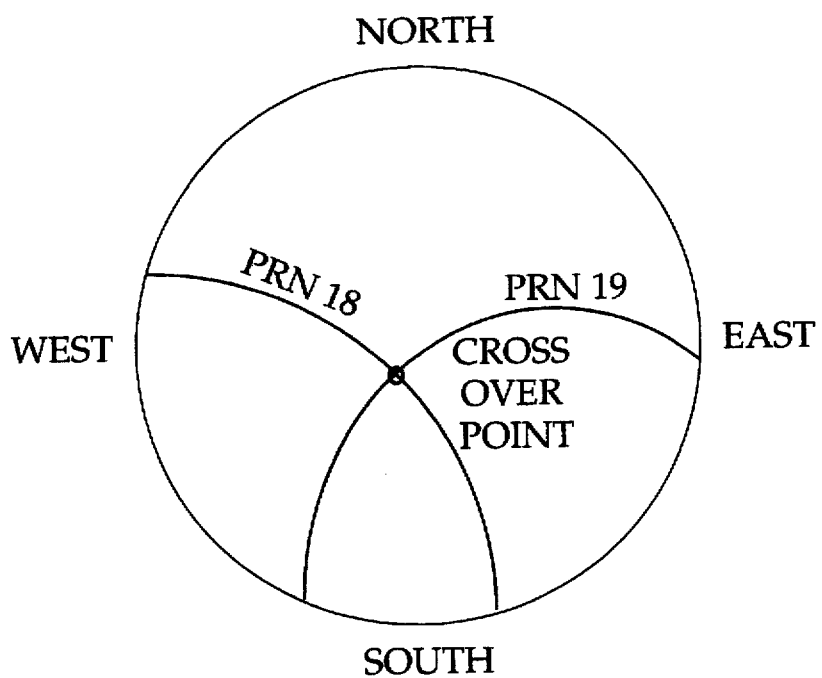
FIG. 2 is an azimuth and elevation angle graph of the trajectories of two satellites, indicating their cross-over point.
Figure 3:
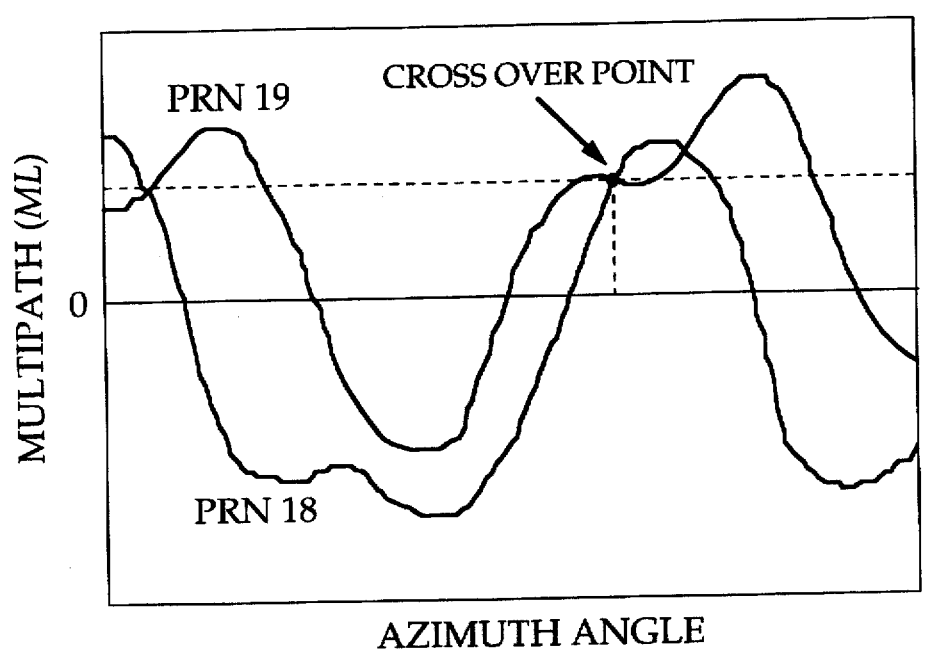
FIG. 3 is a graph of calibrated multipath error versus azimuth angle for the two satellites shown in FIG. 2.

The present invention includes a method for calibrating multipath errors on pseudorange measurements without changing the receiver hardware. The technique begins by recognizing that multipath is dependent on the environment geometry around a GPS antenna (buildings, metal structures, etc.). Because of the geometric dependency of multipath, multipath error is uniquely determinedly a given azimuth and elevation angle. Consequently, the multipath error of each satellite must be the same at a cross over point, i.e., a point where the trajectories of two different satellites meet in an azimuth vs. elevation plot (see FIGS. 2 and 3). As a result, as the present inventor apparently has recognized and exploited for the first time, it is possible to develop a method that uses these facts to calibrate the multipath errors of GPS satellites relative to the constant multipath mean bias of a reference GPS satellite and thereby eliminate multipath errors—including mean bias errors—to obtain unprecedented accuracies in GPS measurements.

These calibrated multipath errors can be fitted to spherical harmonics functions to generate a hemisphere multipath surface model that is then used to subtract out the multipath later. Fitting the multipath error to spherical harmonics has the advantages that the multipath can then be interpolated between satellites and the storage space required for the multipath calibration data can be dramatically reduced. This technique does not need any hardware modification to existing GPS receivers, and it can be applied to any GPS receiver by calibrating the multipath around the GPS antenna and upgrading software.

The following discussion presents a detailed description of one embodiment of the invention and introduces a new multipath observable called pseudo-multipath.

Let us assume that receiver noise and multipath in continuous carrier phase are negligibly small compared to those in pseudorange. The following are general GPS observation equations for pseudoranges (p1, p2) and continuous carrier phases ($\phi$1, $\phi$2) for L1 and L2 frequencies from the GPS antenna to the j-th satellite (superscripts indicate satellites).

$$\rho 1^j = d^j + i^j + t^j + m1^j - B^j + b + \eta 1^j \quad (1)$$

$$\phi 1^j = d^j - i^j + t^j - B^j + b + N1^j \cdot \lambda 1 \quad (2)$$

$$\rho 2^j = d^j + \gamma \cdot i^j + t^j + m2^j - B^j + b + \eta 2^j \quad (3)$$

$$\phi 2^j = d^j - \gamma \cdot i^j + t^j - B^j + b + N2^j \cdot \lambda 2 \quad (4)$$

where p1, p2: measured pseudorange for L1 and L2 frequencies $\phi$1, $\phi$2: measured continuous carrier phase for L1 and L2 frequencies d: physical distance from receiver to satellite i: ionospheric time delay for L1 frequency t: tropospheric delay m1, m2: multipath in pseudorange for L1 and L2 frequencies B: satellite clock offset b: receiver clock offset $\eta$1, $\eta$2: receiver noise of pseudorange for L1 and L2 frequencies N1, N2: number of cycles in continuous carrier phase $\lambda$1, $\lambda$2: wavelength of L1 and L2 frequencies $$\gamma = \left(\frac{\lambda 2}{\lambda 1}\right)^2 \approx 1.65$$

Define the divergence ($\Delta$1) for L1 frequency and the carrier ionospheric time delay ($i_\phi$) for L1 frequency as follows:

$$\Delta 1^j \equiv \rho 1^j - \phi 1^j \quad (5)$$

$$= 2 \cdot i^j + m1^j + \eta 1^j - N1^j \cdot \lambda 1$$

$$i_\phi^j \equiv \frac{1}{\gamma - 1}(\phi 2^j - \phi 1^j) \quad (6)$$

Notice that divergence has only ionospheric terms, multipath error, and cycle ambiguities which are constant. Carrier ionospheric time delay is a very precise ionospheric time delay measurement which has unknown bias due to the cycle ambiguity. A plot of divergence and carrier ionospheric time delay using real data is given in FIG. 4.

Figure 4:
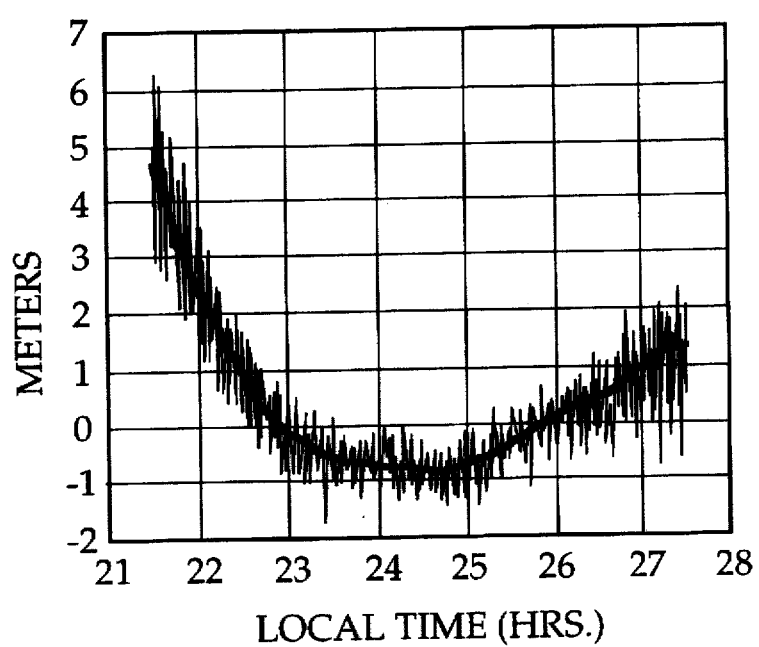
FIG. 4 is a graph of divergence versus local time (noisy curve) superimposed upon a graph of two times ionospheric time delay using carrier phases of L1 and L2 versus local time (smooth curve).
Figure 5:
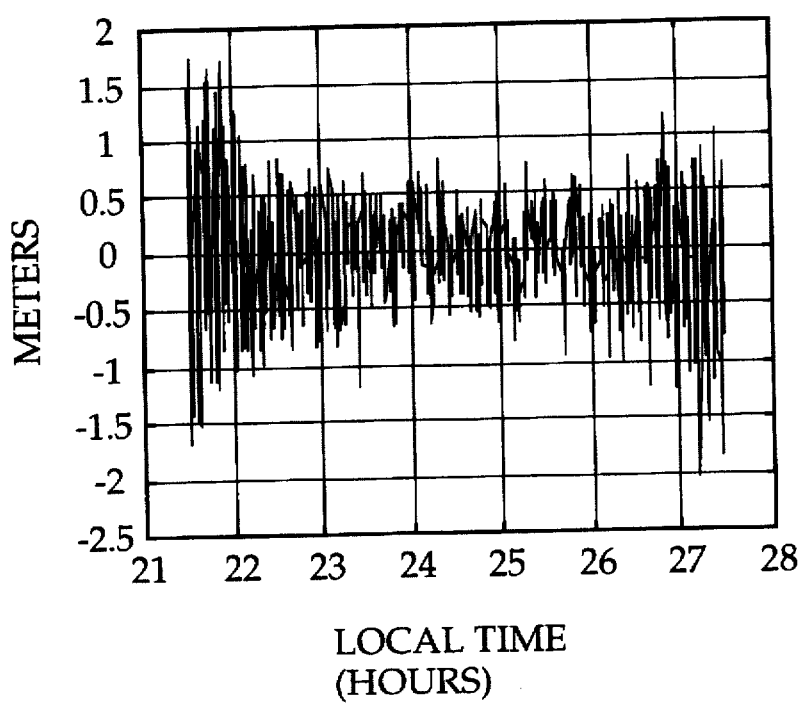
FIG. 5 is a graph of pseudo-multipath versus local time for the data shown in FIG. 4.
Figure 6:
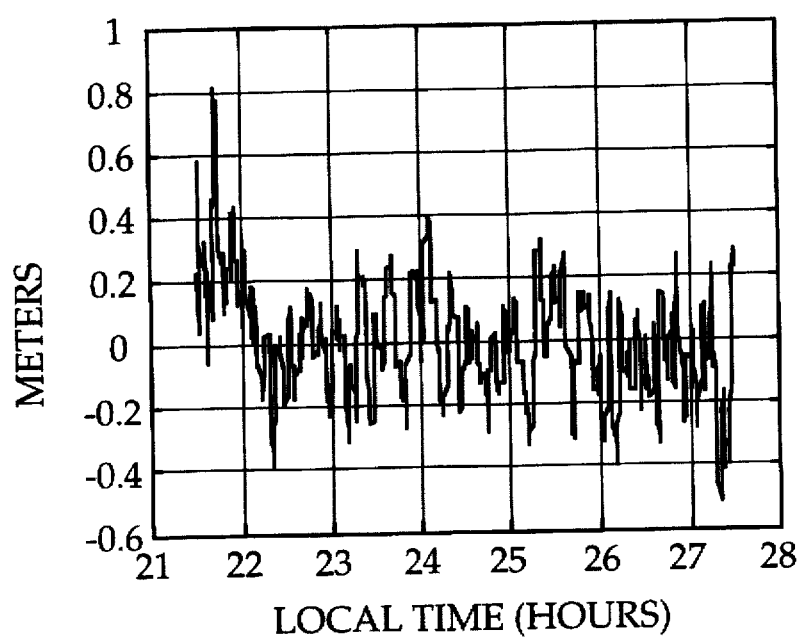
FIG. 6 is a graph of averaged pseudo-multipath over 15 epochs vs. local time.

Now we introduce a new quantity ($\mu$), 'pseudo-multipath', which comes after eliminating the precise ionospheric time delay from the divergence.

$$\mu 1 \equiv \Delta 1^j + 2 \cdot i_\phi^j \quad (7)$$

where $\mu$1 is the pseudo-multipath for the L1 frequency. Pseudo-multipath for the data used to plot FIG. 4 is given in FIG. 5. An averaged pseudo-multipath over 15 epochs for the same data is shown in FIG. 6. The multipath signature is visible in this figure.

After some algebraic manipulation, we find the following relationship:

$$m1^j - \overline{m1^j} + \eta 1^j = \mu 1^j - \overline{\mu 1^j} \quad (8)$$

$$\therefore m1^j = \mu 1^j - (\overline{\mu 1^j} - \overline{m1^j}) - \eta 1^j \quad (9)$$

where $\overline{(\cdot)}$ is the mean value of $(\cdot)$.

The above equation means that pseudo-multipath is equivalent to multipath error in pseudorange except for bias and receiver noise. The receiver noise in the above equation is relatively small compared to multipath error and can be reduced using a Hatch filter. However, the bias can be very big because of unknown cycle ambiguities and is different for each satellite. But this bias can be calibrated using the fact that multipath is dependent on geometry around the GPS antenna. Consequently, the multipath at the cross over point for two different satellites must be the same.

If we rewrite equation (9) with a new variable, we get:

$$\therefore m1^j = \mu 1^j - d\mu_c^j - \eta 1^j \quad (10)$$

$d\mu_c^j = \overline{\mu 1^j} - \overline{m1^j}$ is the pseudo-multipath mean bias of j-th satellite compared to that of a reference satellite at the cross over point.

Now the remaining problem is to find the pseudo-multipath mean biases for all satellites. Multiple days of data will help reduce errors in estimating relative multipath biases. If we use multiple days of data and there is no change in the multipath environment, the mean of multipath of each satellite for the first day should be the same as that for the rest of days in the same interval of azimuth and elevation angle. So the mean value of pseudo-multipath has to be adjusted for all of the days as follows. The subscript, i, in the following equations indicates the i-th day.

$$\mu 1_i^j = \mu 1_i^j - \Delta \mu 1_{ui}^j \quad (11)$$

$$\Delta \mu 1_{ui}^j = \overline{\mu 1_i^j} - \overline{\mu 1_i^j} \quad (12)$$

where $\mu 1_i^j$: pseudo-multipath of j-th satellite for i-th day $\mu 1_i^j$: mean value adjusted pseudo-multipath of j-th satellite for i-th day $\Delta \mu 1_{ui}^j$: relative pseudo-multipath mean value bias of j-th satellite for i-th day relative to first day.

Figure 7:
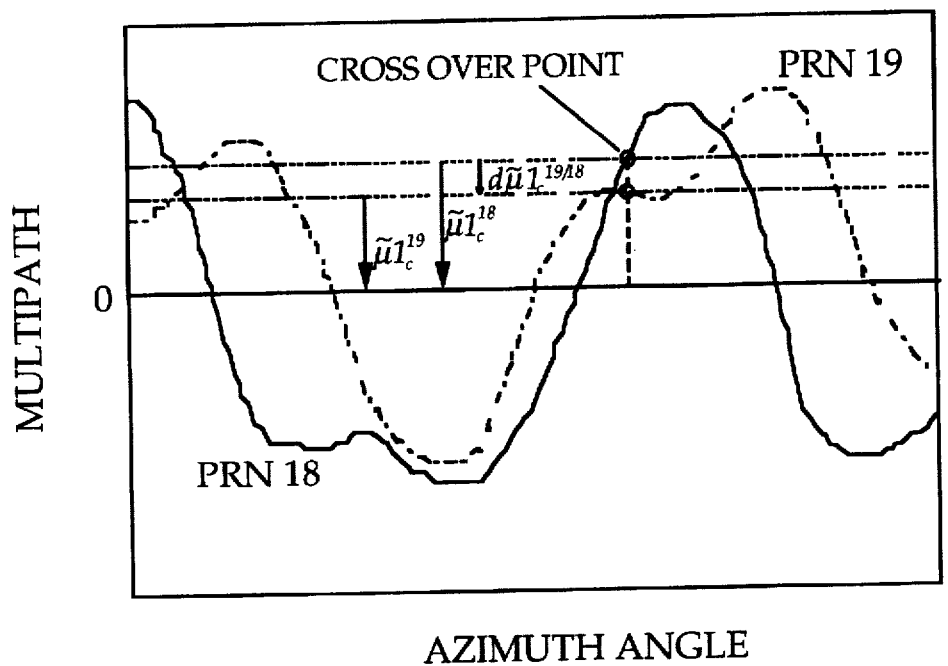
FIG. 7 is a graph of uncalibrated pseudo-multipath versus azimuth angle for two satellites, indicating the pseudo-multipath mean bias and the differing pseudo-multipath values at the cross-over point.

Unless we know the absolute multipath bias of a reference satellite, we estimate the relative multipath bias for each satellite relative to the reference satellite. Pseudo-multipath and pseudo-multipath mean bias at the cross over point are shown in FIG. 7.

An equation to calibrate pseudo-multipath mean value bias ($d\mu_c^{jk}$) using m days (i=1, 2, . . . , m) of data and n satellites (j, k=1, 2, . . . , n) is:

$$z = Hx \quad (13)$$

where $$z = \begin{bmatrix} z_1 \\ z_2 \\ \vdots \\ z_m \end{bmatrix}, z_i = \begin{bmatrix} d_i^1 \\ d_i^2 \\ \vdots \\ d_i^{n-1} \end{bmatrix}, d_i^j = \begin{bmatrix} d_i^{(j+1)/j} \\ d_i^{(j+2)/j} \\ \vdots \\ d_i^{n/j} \end{bmatrix}$$

$$H = \begin{bmatrix} H_1 \\ H_2 \\ \vdots \\ H_m \end{bmatrix}, H_1 = H_2 = \ldots = H_m = \begin{bmatrix} H^1 \\ H^2 \\ \vdots \\ H^{n-1} \end{bmatrix},$$

$$H^j = \begin{bmatrix} 0\ldots0 & -1 & 0\ldots0 & 1 & 0 & \ldots 0 \\ 0\ldots0 & -1 & 0\ldots0 & 0 & 1 & \cdot \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & 0 \\ 0\ldots0 & -1 & 0\ldots0 & 0\ldots & 0 & 1 \end{bmatrix}$$

$\underbrace{\qquad}_{j-2\ \text{columns}} \underbrace{\qquad}_{(j-1)th\ \text{column}} \underbrace{\qquad}_{n-j\ \text{columns}}$ $$x = \begin{bmatrix} d\bar{\mu}_c^{2/1} \\ d\bar{\mu}_c^{3/1} \\ \vdots \\ d\bar{\mu}_c^{n/1} \end{bmatrix}$$

$d_i^{j/k} = \bar{\mu} 1_c^j - \bar{\mu} 1^{c/k}$ $d\bar{\mu}_c^{j/k} = \bar{\mu} 1_c^j - \bar{\mu} 1_c^k$.

Because the above equation is obviously overdetermined, we use a simple batch least squares technique to solve the equation.

$$x = (H^T H)^{-1} H^T z \qquad (14)$$

After we solve the above equation, we put it back into equation (10) to get a calibrated multipath ($\tilde{m}1$) of each satellite (j=1, 2, . . . , n) for all days.

$$\tilde{m}1^j = \bar{\mu}1^j - d\bar{\mu}_c^{j/1} \qquad (15)$$

The calibrated multipath ($\tilde{m}1$) equals the true multipath (m1) plus a constant bias of the reference satellite multipath ($d\mu_c^1$). But the constant bias is the same for all satellites and will be absorbed as a receiver clock bias when we do positioning fixes with the pseudoranges, in which multipaths are eliminated using the calibrated multipaths. Therefore, this bias will not reduce positioning accuracy at all.

Once we get the calibrated multipath, we use it to eliminate multipath pseudorange errors. There are many methods for storing the calibrated multipath and using the data. We discuss two methods in this disclosure. One method is to make a table of azimuth and elevation angle vs. calibrated multipath for each satellite and find the multipath in the table using the available azimuth and elevation angle at each epoch. This will require a fairly large storage space and is very sensitive to GPS orbital fluctuations, but provides very good accuracy. The other method is to fit all the available data to n-th order spherical harmonics and call the resulting spherical harmonics function when we need it. This technique compensates for the low-frequency multipath pseudorange errors and is more robust to GPS orbital fluctuations. This method will also require a lot less storage space than the first method because we need to store only the spherical harmonics calibration coefficients. The spherical harmonics functions and the calibration coefficients are defined as follows:

$$\tilde{m}1(\theta,\phi) = \qquad (16)$$

$$\sum_{l=1}^{n} \left[ J_l \cdot P_l(\cos\theta) + \sum_{m=1}^{l} P_{lm}(\cos\theta) \cdot (C_{lm} \cos m\phi + S_{lm} \sin m\phi) \right]$$

where
  $\theta$: elevation angle
  $\psi$: azimuth angle
  $J_l$, $C_{lm}$, $S_{lm}$: spherical harmonics calibration coefficients
  $P_{lm}(\cdot)$: Legendre polynomial To summarize, the following is a general procedure for calibrating multipath using a spherical harmonics surface fit.

1. Find where cycle slips occur and divide the measured data into cycle-slip-free intervals.

2. Smooth the measured pseudorange with continuous carrier phase for the cycle-slip-free intervals using averaging techniques that reduce receiver noise in the pseudorange.

3. Compute the pseudo-multipath (µ1) of each satellite using the smoothed pseudorange for L1 frequency (ρ1) and the continuous carrier phase for the L1 and L2 frequencies (φ1, φ2).

4. Form the adjusted pseudo-multipath (µ1) of each satellite so that the mean value of pseudo-multipath for the first day is the same as that for the rest of days in the same elevation and azimuth interval.

5. Compute the pseudo-multipath mean bias ($d\mu_c$) using data given at all cross over points for all days.

6. Compute the calibrated multipath ($\tilde{m}1$) of each satellite.

7. Feed the calibrated multipath ($\tilde{m}1$), azimuth ($\psi$), and elevation angle ($\theta$) of all satellites to the spherical harmonics surface fit algorithm, which computes the spherical harmonics calibration coefficients ($J_l$, $C_{lm}$, $S_{lm}$).

Once we compute the spherical harmonics calibration coefficients, we can use them until the multipath environment around the GPS antenna changes. Whenever we need to eliminate multipath from a measured pseudorange, we input the azimuth and elevation angles to the spherical harmonics function along with the already-computed coefficients ($J_l$, $C_{lm}$, $S_{lm}$) to find the corresponding multipath error.

Figure 8:
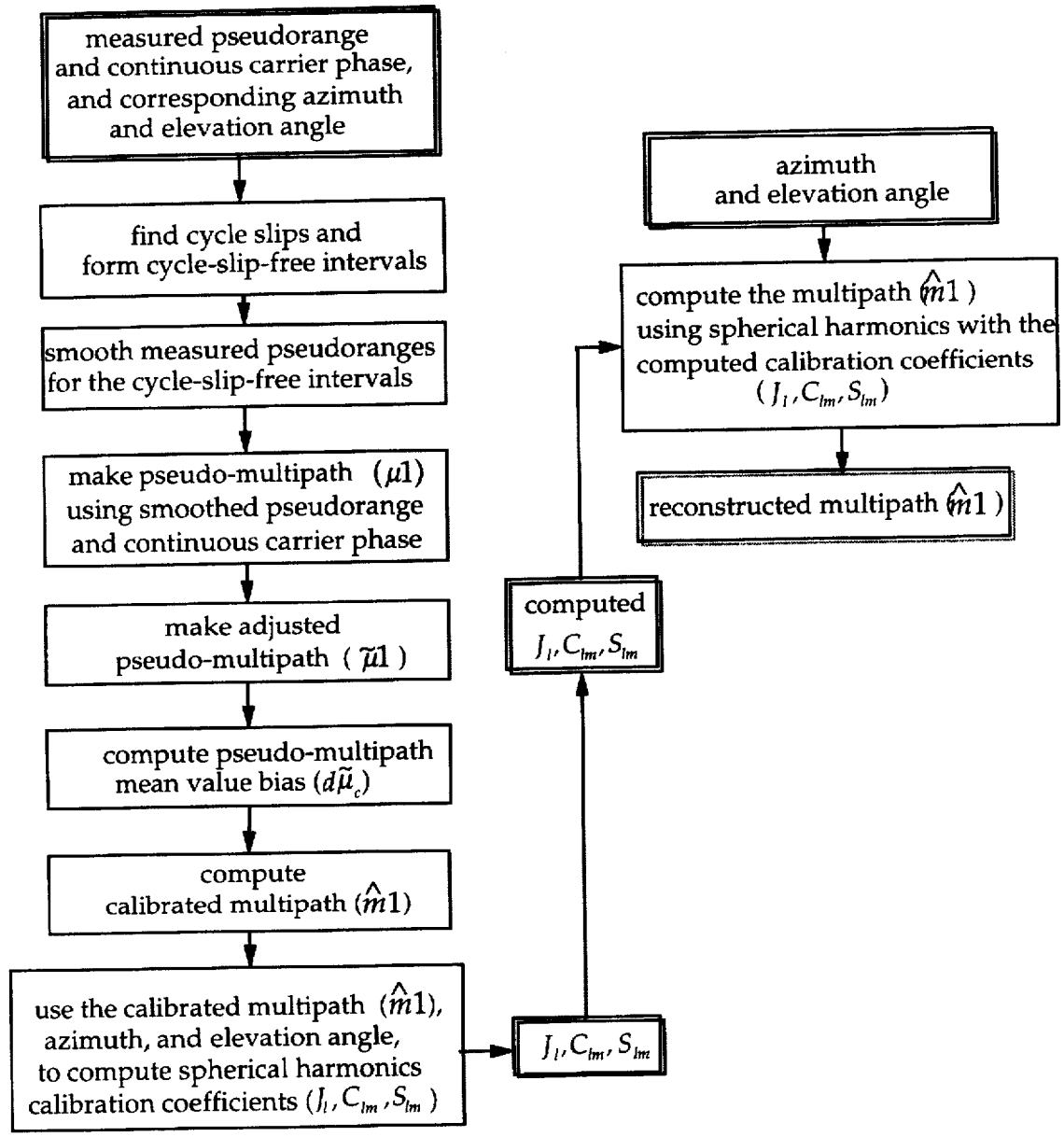
FIG. 8 is a flow diagram of the multipath calibration procedure using spherical harmonics, and the process for estimating multipath in real time.

FIG. 8 shows a block diagram of the multipath calibration procedure using spherical harmonics and the process for estimating multipath in real time. This algorithm can be implemented on conventional GPS receivers by anyone skilled in the art. It is obvious that spherical harmonics need not be used to model the multipath. Any type of function or algorithm that maps points of the hemisphere to multipath values can be used.

In order to verify this multipath calibration technique, we collected data on Aug. 26 and 29, 1994 at Stanford, Calif. A GPS antenna was installed on the top of a building, and a data collection schedule (six hours from 9:30 PM until 3:30 AM next day) was carefully chosen so that at least four satellites were seen for most of test period and more than four cross over points could be found for the same set of satellites. The sampling time was 15 seconds, and all the data was smoothed with continuous carrier phase over 15 epochs to see the multipath signature clearly.

Figure 9:
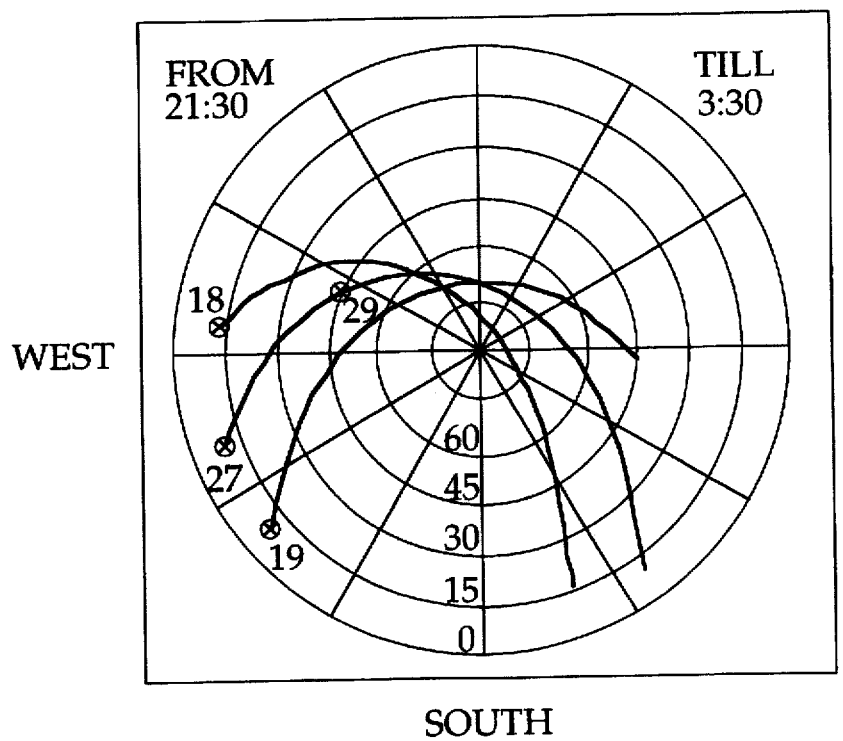
FIG. 9 is an azimuth vs. elevation plot of the trajectories of three satellites during a test period.
Figure 10:
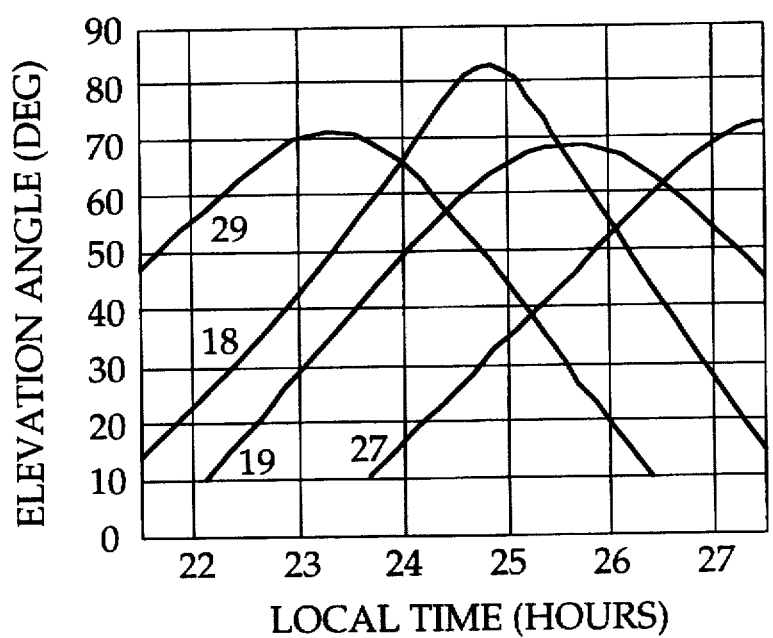
FIG. 10 is an elevation angle vs. local time graph of the trajectories of four satellites.

FIG. 9 shows the azimuth vs. elevation plot during the test period. Six cross over points can be found in the plot. Notice that near the cross over point for PRN18, PRN27, and PRN29, all three satellite trajectories are close together and thus have the potential to confirm multipath's geometry dependency. FIG. 10 shows the elevation angle vs. local time plot. Generally, satellites do not arrive at the cross over point at the same time, and this can be confirmed by FIG. 10.

Figure 11:
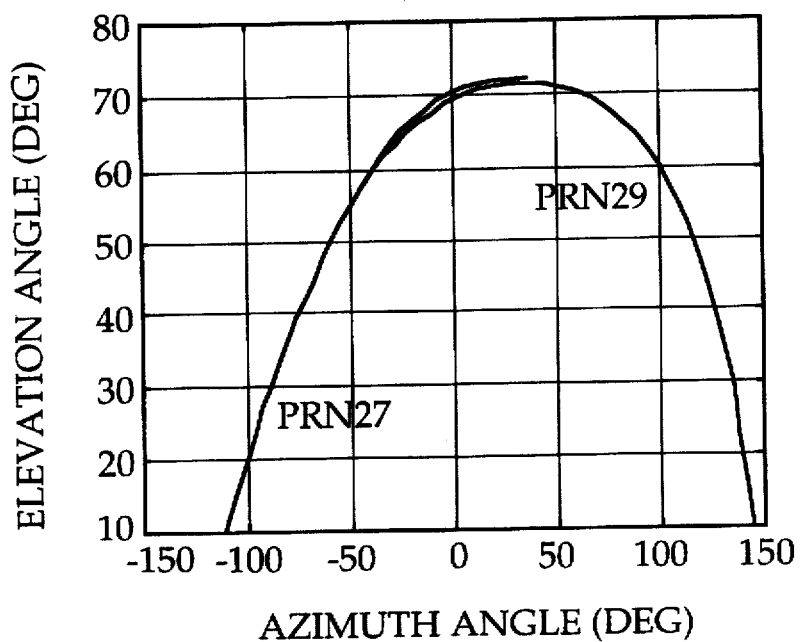
FIG. 11 is a rectangular azimuth vs. elevation graph for two satellites whose trajectories are very close to each other.
Figure 12:
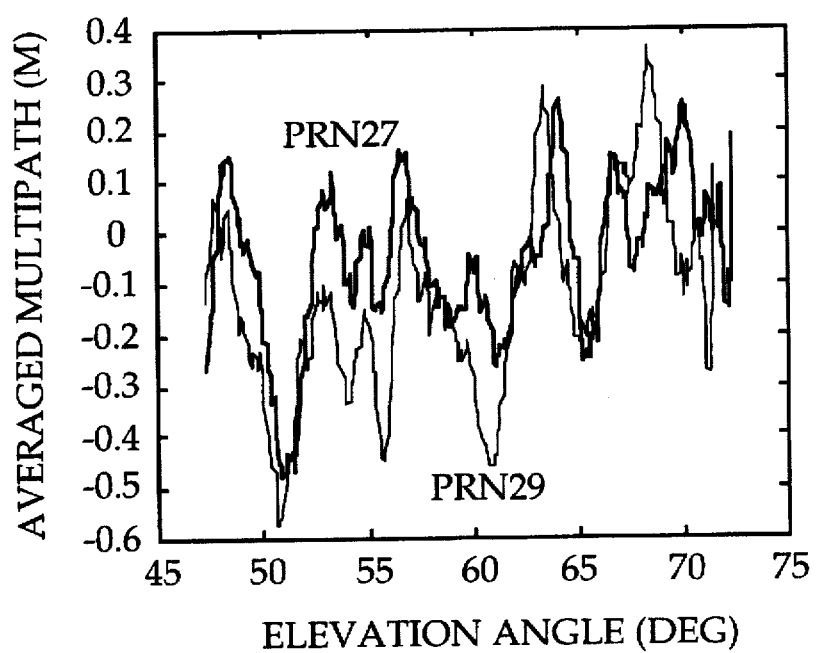
FIG. 12 is a graph of the averaged pseudo-multipaths over 15 epochs versus elevation angle for the two satellites whose trajectories are shown in FIG. 11.
Figure 13:
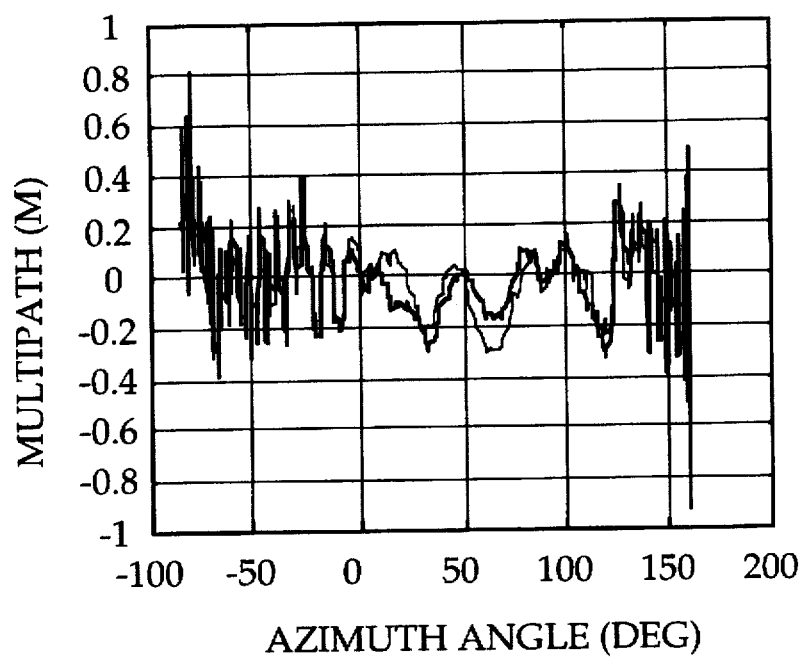
FIG. 13 is a graph of averaged pseudo-multipath for PRN 18 over 15 epochs versus azimuth angle.
Figure 14:
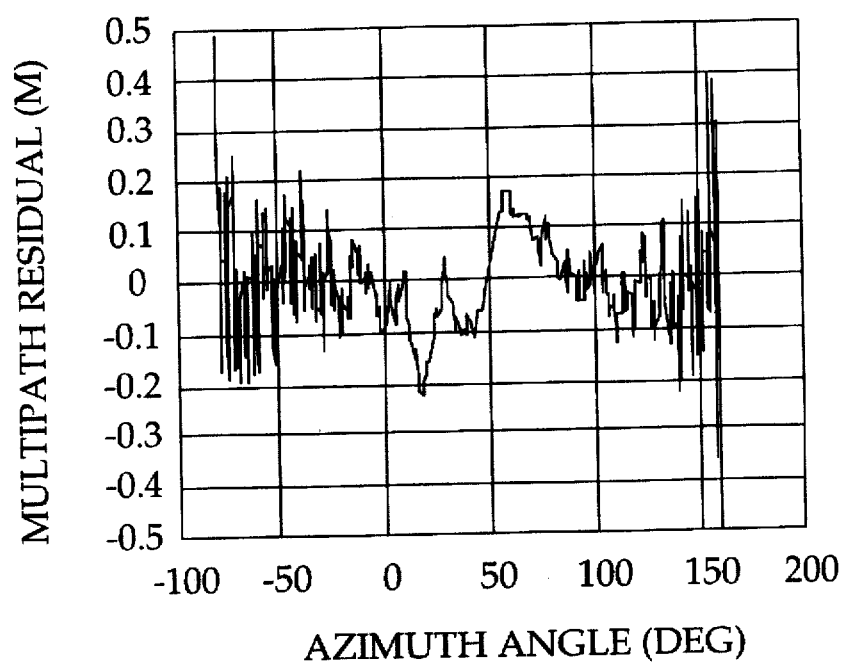
FIG. 14 is a graph of averaged pseudo-multipath residual for PRN 18 over 15 epochs.
Figure 15:
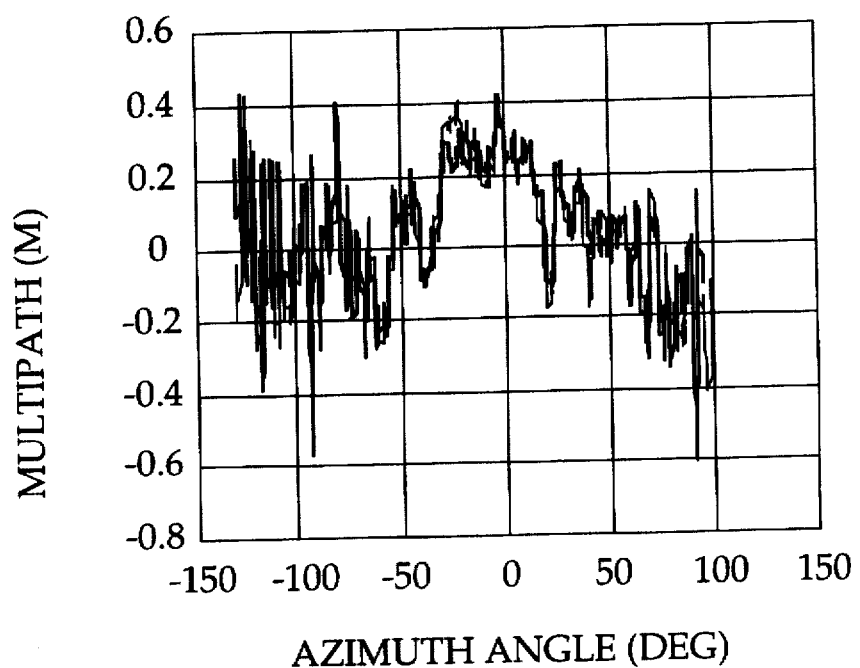
FIG. 15 is a graph of averaged pseudo-multipath for PRN 19 over 15 epochs versus azimuth angle.
Figure 16:
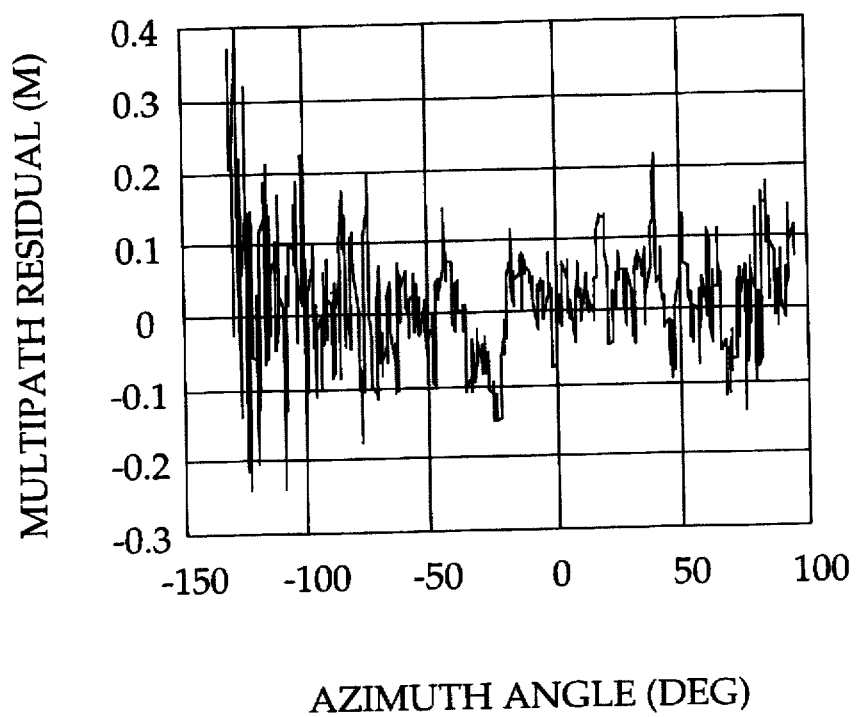
FIG. 16 is a graph of averaged pseudo-multipath residual for PRN 19 over 15 epochs.
Figure 17:
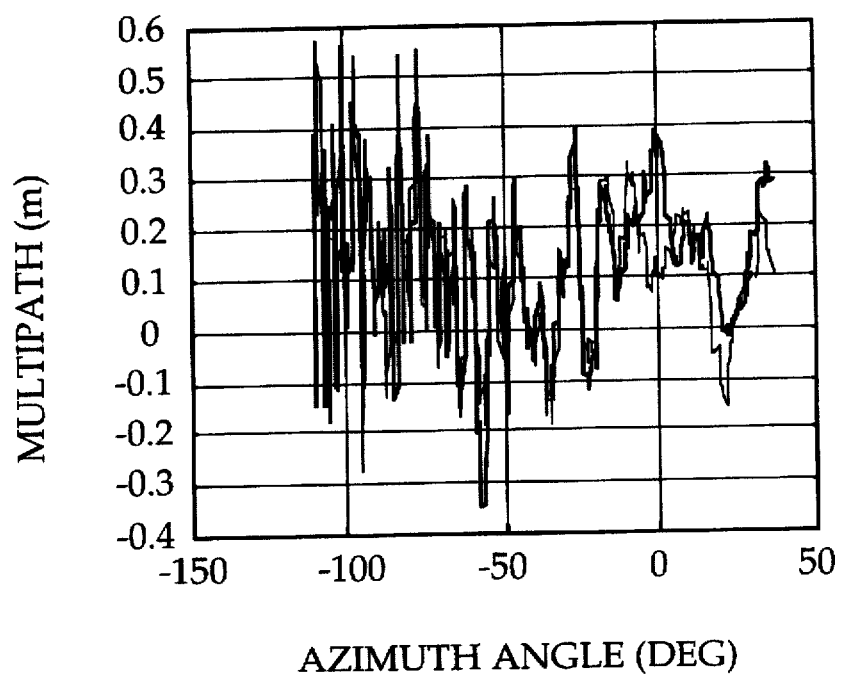
FIG. 17 is a graph of averaged pseudo-multipath for PRN 27 over 15 epochs versus azimuth angle.
Figure 18:
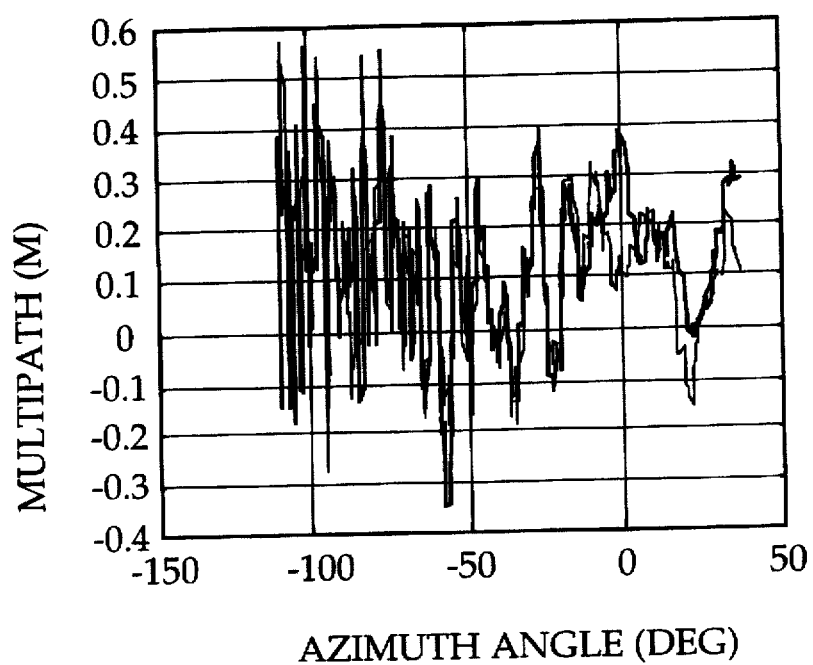
FIG. 18 is a graph of averaged pseudo-multipath residual for PRN 27 over 15 epochs.
Figure 19:
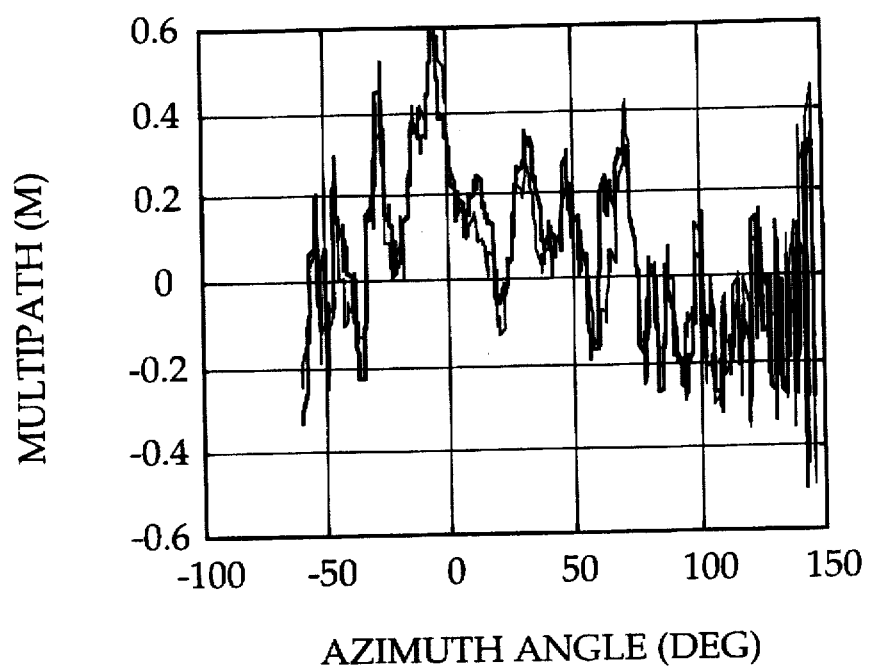
FIG. 19 is a graph of averaged pseudo-multipath for PRN 29 over 15 epochs versus azimuth angle.
Figure 20:
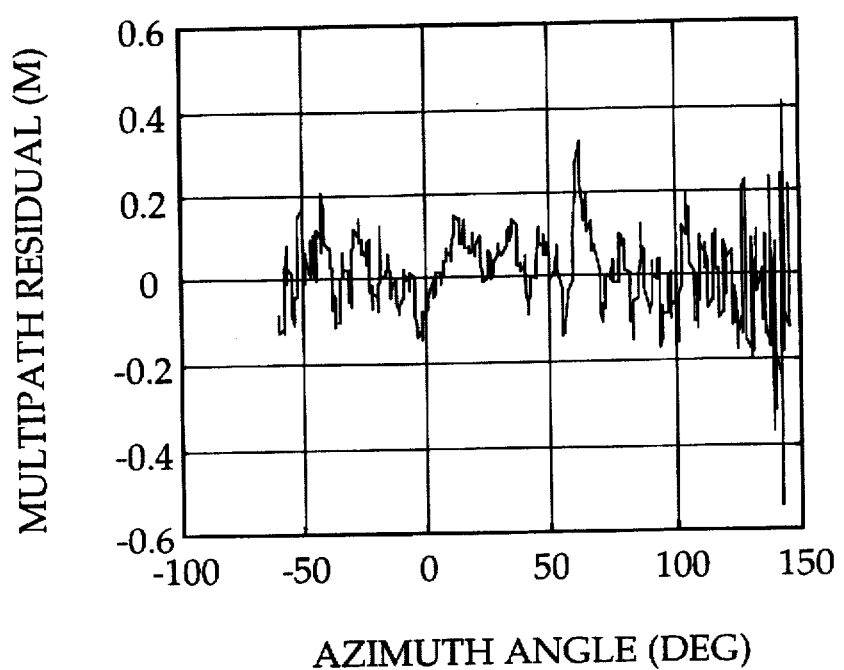
FIG. 20 is a graph of averaged pseudo-multipath residual for PRN 29 over 15 epochs.

FIG. 11 shows the trajectories of PRN27 and PRN29 in rectangular azimuth vs. elevation coordinates. For about two hours, the two satellite trajectories are very close to each other. FIG. 12 shows the averaged pseudo-multipaths of PRN27 and PRN29 over 15 epochs. There are very strong correlations between the averaged pseudo-multipath of PRN27 and PRN29, and this clearly indicates multipath's geometric dependency. Because the trajectories of the satellites are not exactly the same, the pseudo-multipaths are also not exactly the same.

FIGS. 13-20 show averaged pseudo-multipaths and residuals of each PRN for two different days after the relative pseudo-multipath mean value bias is eliminated using equations (11) and (12). All the plots demonstrate the daily repetition of multipath. Table 1 is a summary of FIGS. 13-20.

TABLE 1

Summary of RMS error template technique
(FIGS. 13-20)

| | RMS error (cm) |
|---|---|
| Averaged pseudo-multipath | 18.2 |
| Residual for two days | 10.4 |

Figure 21:
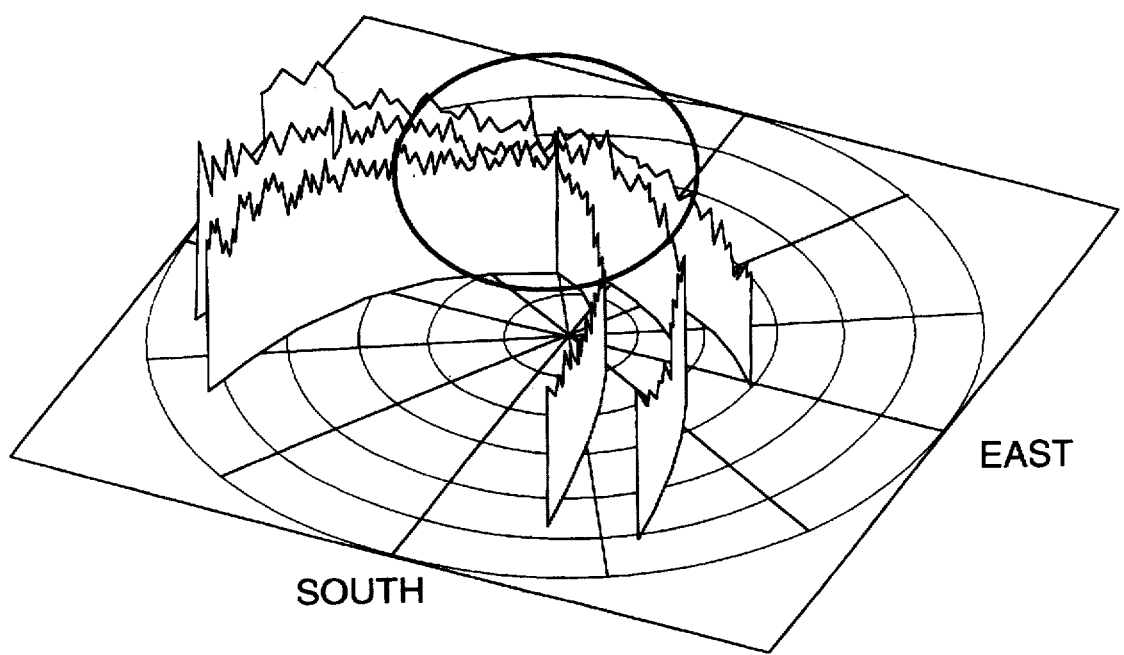
FIG. 21 shows a three-dimensional plot of pseudo-multipath versus azimuth and elevation angle for several satellites.
Figure 22:
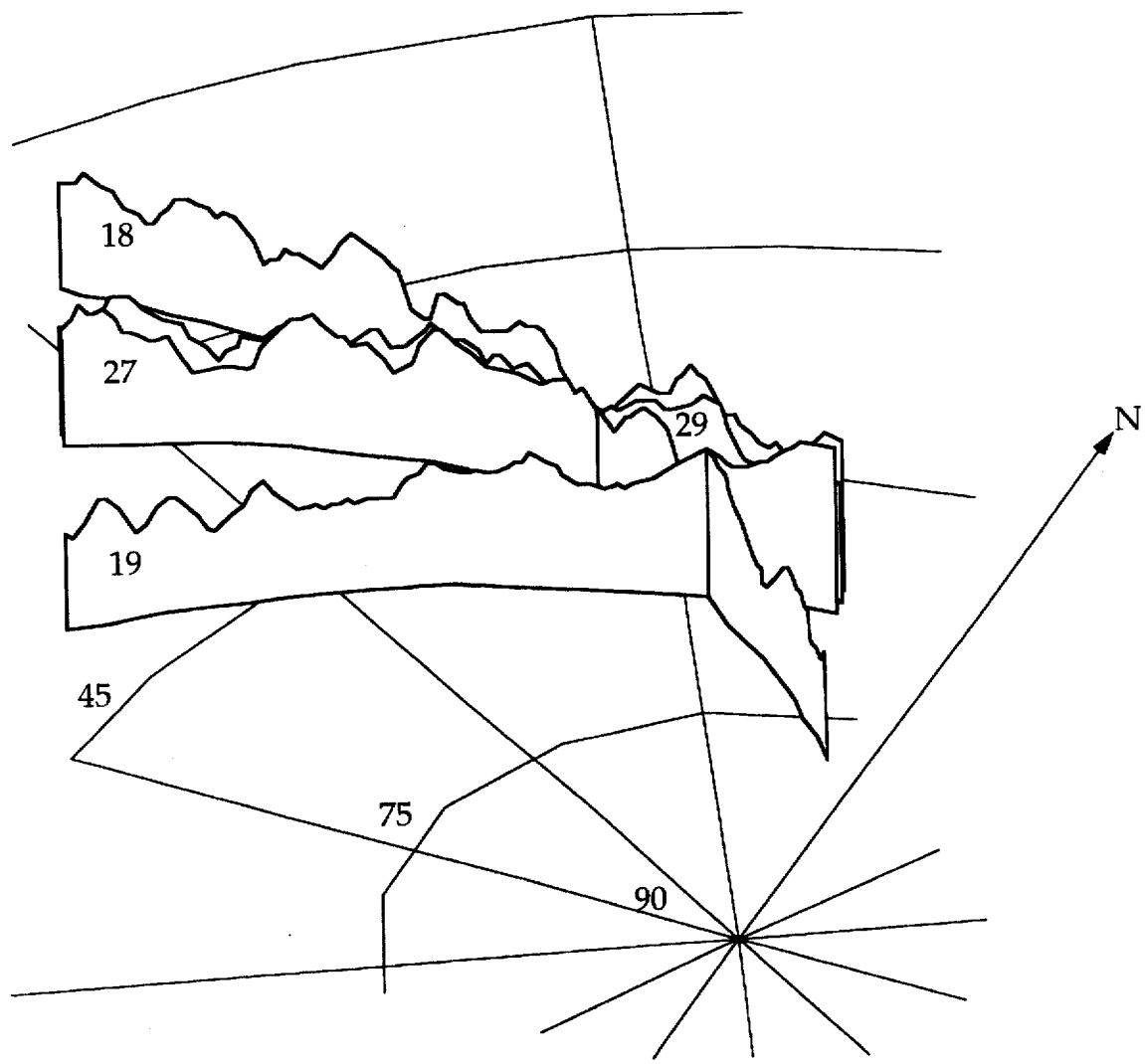
FIG. 22 is a close up view of the cross-over region indicated by the circle drawn in FIG. 21.
Figure 23:
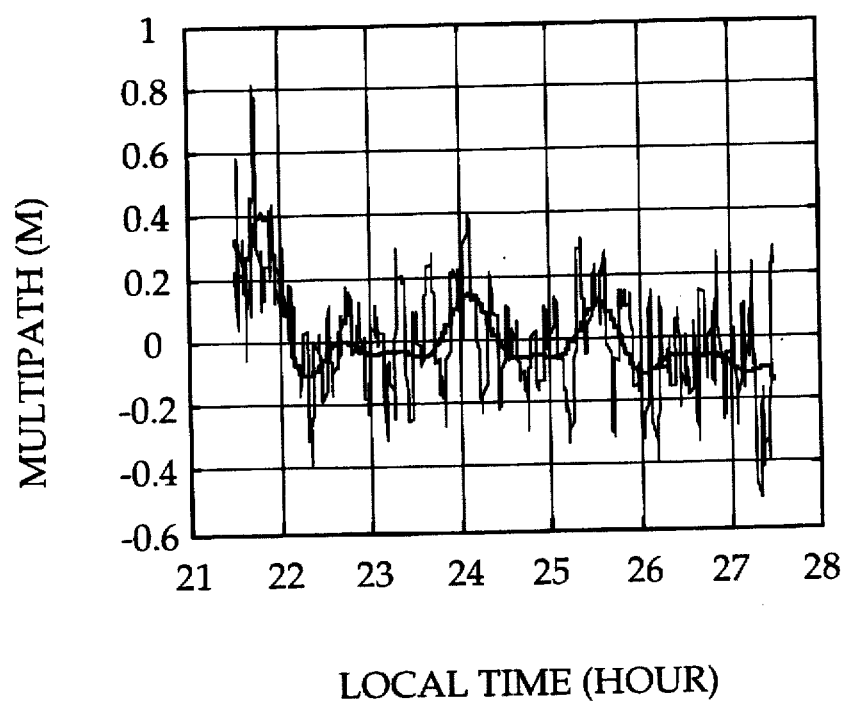
FIG. 23 is a graph for PRN 18 of calibrated multipath (noisy curve) and reconstructed multipath (smooth curve) versus local time.
Figure 24:
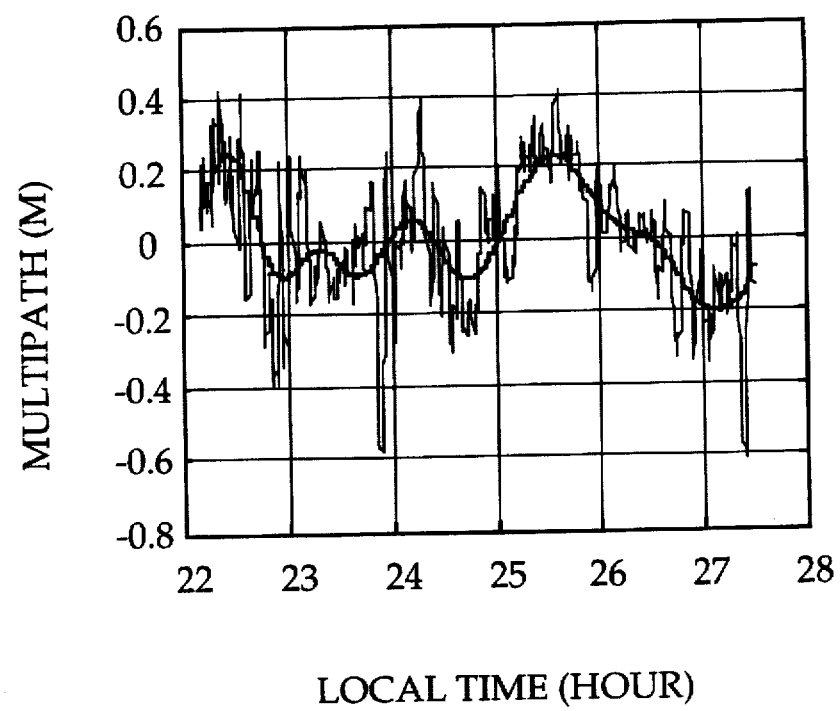
FIG. 24 is a graph for PRN 19 of calibrated multipath (noisy curve) and reconstructed multipath (smooth curve) versus local time.
Figure 25:
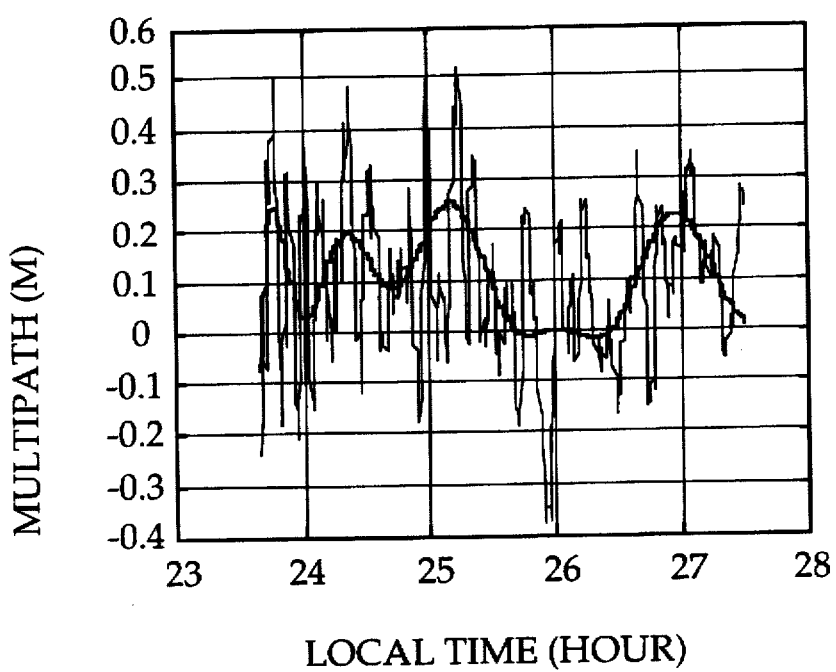
FIG. 25 is a graph for PRN 27 of calibrated multipath (noisy curve) and reconstructed multipath (smooth curve) versus local time.
Figure 26:
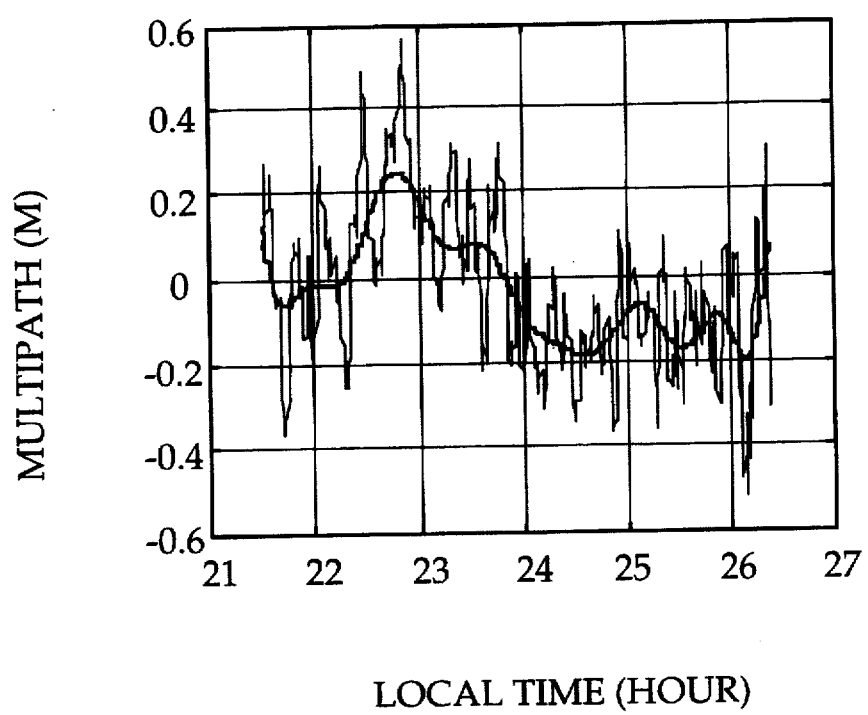
FIG. 26 is a graph for PRN 29 of calibrated multipath (noisy curve) and reconstructed multipath (smooth curve) versus local time.

FIG. 21 shows a three-dimensional plot of pseudo-multipath vs. azimuth and elevation angle for all satellites, and FIG. 22 is a close up view of the circle drawn in FIG. 21. As mentioned before, the trajectories of PRN 18, 26, and 29 are close together in the circle drawn in FIG. 21; therefore this example has potential to confirm the geometry dependency of multipath. FIG. 22 shows that the multipath of all the satellites inside the circle have very strong correlations in both tendency and magnitude, and those of PRN27 and PRN29 match together. This verifies the existence of a geometric dependency.

In FIG. 22 the trajectories of all satellites are very close together; thus multipath signals of all the satellites on the region are expected to be similar. Note that the multipath signals of PRN27 and PRN29 are very close.

We assigned PRN18 to be the reference satellite and computed the pseudo-multipath mean biases for PRN19, PRN27, and PRN29 using the data available at the cross over points. Table 2 shows the results of solving equation (14).

TABLE 2

Computed pseudo-multipath mean bias

| | computed pseudo-multipath mean bias (cm) |
|---|---|
| $d\bar{\mu}_c^{18}$ | 0.0 |
| $d\bar{\mu}_c^{19}$ | -0.9 |
| $d\bar{\mu}_c^{27}$ | -10.0 |
| $d\bar{\mu}_c^{29}$ | 2.3 |

Note that the pseudo-multipath mean bias for PRN27 is fairly large. Consequently, if we were to use an unadjusted pseudo-multipath to reduce multipath in pseudorange (as is done in Bishop's technique), this would result in large unexpected errors in positioning accuracy.

After we adjust the pseudo-multipath mean bias and get the calibrated multipath for each satellite, we feed the calibrated multipath, azimuth, and elevation angle to the spherical harmonics surface fit and compute calibration coefficients. FIGS. 23-26 show the reconstructed multipath for each satellite using the spherical harmonics function with the computed calibration coefficients on top of the calibrated multipath. The reconstructed multipath matches the calibrated multipath at low frequency, and the residual has only a high-frequency component. Averaging pseudorange with continuous carrier phase for longer periods of time can reduce most of these high-frequency residuals. The RMS error residual for the surface fit shown in FIGS. 23-26 is 13.7 cm.

TABLE 3

Summary of residual RMS errors for spherical harmonics
surface fit (FIGS. 23-26)

| | RMS error (cm) |
|---|---|
| Residual | 13.7 |

APPLICATIONS, VARIATIONS AND ALTERNATIVE EMBODIMENTS

This multipath calibration technique will help not only static users but it can also help kinematic survey and real-time differential GPS (DGPS) users solve for cycle ambiguities faster and more reliably. It will also help reduce errors in ionospheric time delay measurements for dual-frequency users.

The present technique is not limited to receivers in a constant multipath environment, i.e., to fixed reference stations such as reference stations for precise orbit determination, stations for monitoring ionosphere, Differential GPS (DGPS) reference stations, and Wide Area Differential GPS (WADGPS) monitor stations. For example, in the case of relatively isolated vehicles like aircraft and spacecraft, for which the multipath environment changes with vehicle attitude but does not change in the body coordinate frame, the technique can be applied by interfacing the multipath calibration with an attitude sensor.

Figure 27:
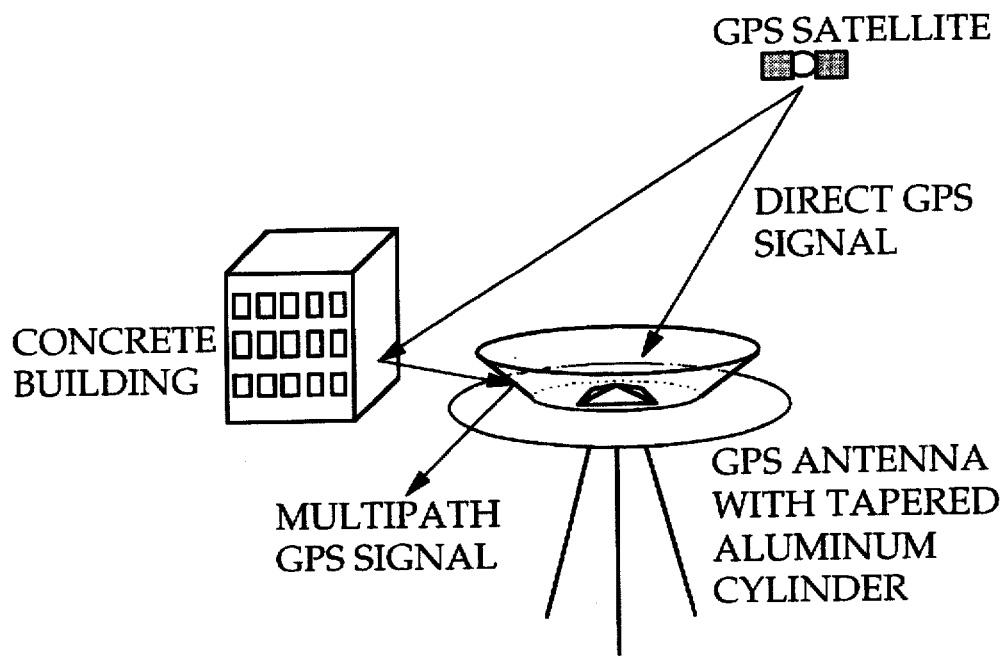
FIG. 27 illustrates an antenna shield which may be used in conjunction with the method of the present invention to calibrate pseudorange multipath in the case of a mobile receiver.

In the case of a mobile user whose multipath environment may change frequently, the multipath must be actively calibrated. The following technique can be used to calibrate multipath in such cases. A hollow aluminum cylinder, tapered so that it is narrower on the bottom and wider and open on the top, is placed around the antenna as shown in FIG. 27. Since multipath signals generally approach the antenna from nearby objects at low elevation angles (10-15 deg), this multipath shield blocks the multipath signals while permitting the high elevation satellite signal to reach the antenna. Because the aluminum transmits some of the multipath signal, several such shields can be nested to reject more of the multipath.

Although this multipath shield reduces the multipath error due to the low-elevation object in the environment, it generates multipath of its own. It is still necessary, therefore, to calibrate the multipath generated by the tapered cylinder. Because the multipath will be constant with respect to the attitude of the shield and nearly cylindrically symmetric, the multipath calibration technique is relatively simple. By receiving signals either from satellites or pseudollites in a lab and interfacing them with a knowledge of shield attitude, the multipath can be determined as a function of elevation and azimuth in the shield frame of reference. Because the cylinder is symmetric around the antenna, however, the multipath caused by this cylinder will be almost symmetric. Thus for a given elevation angle multipath will be constant for all azimuth angles and so multipath only needs to be calibrated as a function of elevation angle. Once the multipath is calibrated in this way, multipath can be compensated for exactly as in the case previously described. Installing a tapered cylinder to the user antenna, therefore, will give users a huge benefit to solve cycle ambiguity more quickly and more reliably without changing the receiver hardware itself.

Because of the particular tapered shape of this multipath shield, absolute multipath can be determined using the following technique. By adjusting the attitude of the antenna and tapered cylinder while measuring multipath from a satellite, the attitude corresponding to the minimum multipath can be found. Since only the direct satellite signal arrives at the antenna at this critical angle, the mean bias can be absolutely determined.

The primary beneficiary of the technique of this invention will be dual-frequency receivers from which we can measure ionospheric time delay; but it can be also applied to single-frequency receivers if we use a dual-frequency receiver to eliminate the ionospheric time delay component from measured pseudorange when we calibrate the multipath of a single frequency user. If we use a pseudollite we can calibrate the satellite multipath on the ground. We can calibrate multipath not only for L1 frequency but also for L2 frequency so that people who use wide-lane to solve cycle ambiguity can get benefit from it.

This multipath calibration technique will help both kinematic survey and real-time DGPS users to solve cycle ambiguities faster and more reliably. Wide Area Differential GPS (WADGPS) will get very precise pseudorange observables from Wide Area Reference Stations (WRSs) which do not have multipath-caused biases and as a result can provide very precise WADGPS correction to the users. This technique also gives benefit to estimate ionospheric time delays. For survey applications we can use this calibration technique to calibrate static reference station in passive way (which is the same technique described in the above) To calibrate mobile users, we have to use the technique in an active way because the multipath environment will change from one place to another place. Also this technique will improve time synchronization accuracy for time transfer application much faster, for example, computer network or cellular phone network.

Because the multipath calibration can be done for L1 only, L2 only, or wide-lane (L1/L2) single-frequency C/A code receivers can be a beneficiary. Once the calibration of the tapered cylinder is done using a dual-frequency receiver and a single-frequency receiver we no longer need the dual-frequency receiver to compensate the multipath. After the single-frequency user compensates the multipath using the multipath parameters then cycle ambiguity can be solved to get a centimeter level of positioning accuracy.

A very similar method can be applied to airborne or space-borne single-frequency users. While an aircraft is in the air it will generate the same multipath given the aircraft attitude, i.e., the multipath generated by the aircraft metal surface is fixed to the aircraft body coordinate frame. By interfacing its attitude and the GPS satellite direction the multipath can be compensated and cycle ambiguity can be solved faster and more reliably.

A real-time adaptive scheme can be applied to this technique so that the multipath calibration can be done on line without being done off-line.

Although the above description of the invention contains many specific details, these should not be construed to limit the scope of the invention in any way. Rather, the scope of the invention should be determined by the following claims and their legal equivalents.

We claim:

1. In a global positioning system comprising a GPS receiver, a first satellite having a first trajectory, and a second satellite having a second trajectory that intersects the first trajectory in an azimuth vs. elevation plot at a cross-over point, a method for multipath calibration of pseudorange measurements comprising the steps of:

receiving a first signal at the receiver from the first satellite, where a portion of the first signal is received when the first satellite is at the cross-over point;

receiving a second signal at the receiver from the second satellite, where a portion of the second signal is received when the second satellite is at the cross-over point; and determining a first calibrated pseudorange multipath signal and a second calibrated pseudorange multipath signal by correlating the portion of the first signal with the portion of the second signal, whereby the relative mean multipath bias between the first signal and the second signal is eliminated.

2. The method of claim 1 further comprising the step of eliminating multipath pseudorange errors in subsequent signals received at the receiver from the first satellite and the second satellite by using the first calibrated multipath signal and the second calibrated multipath signal.

3. The method of claim 1 further comprising the steps of fitting a function to the first calibrated multipath signal and the second calibrated multipath signal; and eliminating multipath pseudorange errors in subsequent signals received at the receiver from the first satellite and the second satellite by using the function.

4. The method of claim 3 wherein the function is a linear combination of spherical harmonics.

5. The method of claim 3 further comprising the steps of: measuring the attitude of an antenna of the receiver; and correlating the attitude with elevation and azimuth data corresponding to the subsequent signals received at the receiver.

6. A method for reducing multipath errors in pseudorange signals received at a GPS receiver from a plurality of satellites, the method comprising adjusting each of the pseudorange signals by each of a corresponding plurality of calibrated multipath signals, the calibrated multipath signals indicating the multipath as a function of direction relative to an antenna of the receiver.

7. The method of claim 6 wherein the calibrated multipath signals are determined by a procedure comprising measuring a set of signals from the satellites, correlating the set of signals at a set of cross-over points of the satellites, and eliminating the relative mean biases between the signals.

8. The method of claim 6 wherein the function is a linear combination of spherical harmonic functions.

9. The method of claim 6 wherein the antenna has a shield mounted around it, the shield being cylindrical and tapered outward toward the top, and wherein the calibrated multipath signals are determined by a procedure comprising measuring a set of multipath signals and fitting a function to the set of multipath signals.

10. The method of claim 9 wherein the function is a polynomial function of the elevation angle.

11. A method for calibrating multipath in GPS pseudorange measurements at a receiver, the method comprising:

measuring a set of multipath signals arriving at an antenna connected to the receiver, the antenna being surrounded by a cylinder tapered outward toward the top that reflects GPS signals arriving at an elevation angle below a predetermined threshold; and fitting a calibration function to the set of multipath signals, the calibration function giving the multipath as a function of elevation angle.

12. The method of claim 11 further comprising eliminating multipath pseudorange errors in subsequent signals received at the receiver by using the calibration function.

13. The method of claim 11 further comprising:

changing the attitude of the antenna and cylinder;

measuring signals received from a satellite while the attitude of the antenna and cylinder is changed; and determining an absolute multipath bias by measuring the minimum amplitude of the signals received from the satellite.

* * * * *